Sept. 3, 1957 E. J. DIEBOLD ET AL 2,805,300
ELECTROMAGNETIC CONTACT DEVICE
Filed March 1, 1955 2 Sheets-Sheet 1
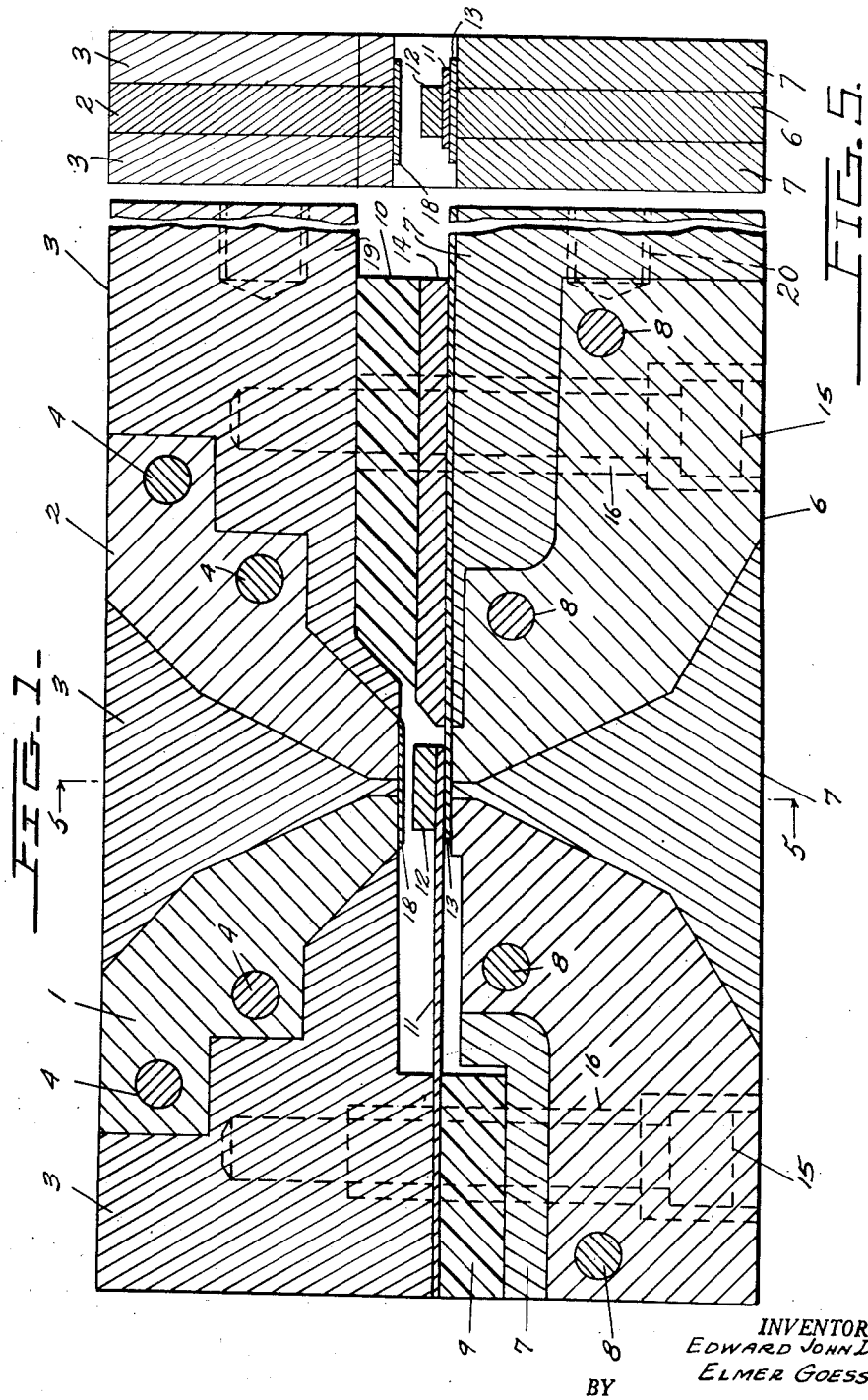
INVENTORS
EDWARD JOHN DIEBOLD
ELMER GOESSEL
BY
Ostrolenk & Faber
ATTORNEYS Sept. 3, 1957     E. J. DIEBOLD ET AL     2,805,300
ELECTROMAGNETIC CONTACT DEVICE
Filed March 1, 1955     2 Sheets-Sheet 2
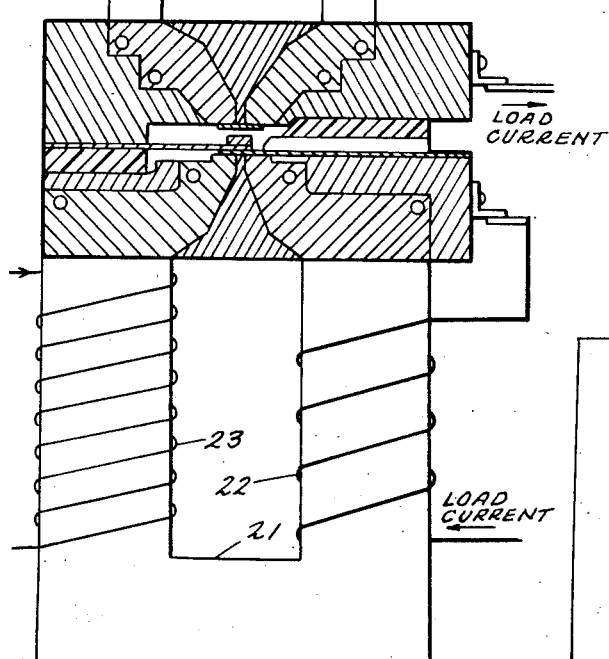
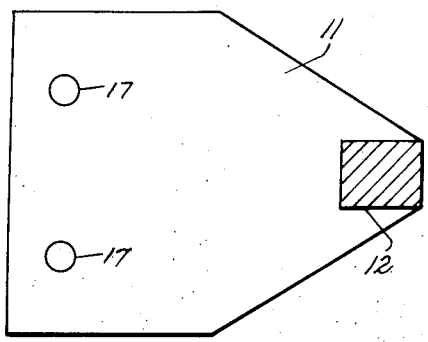
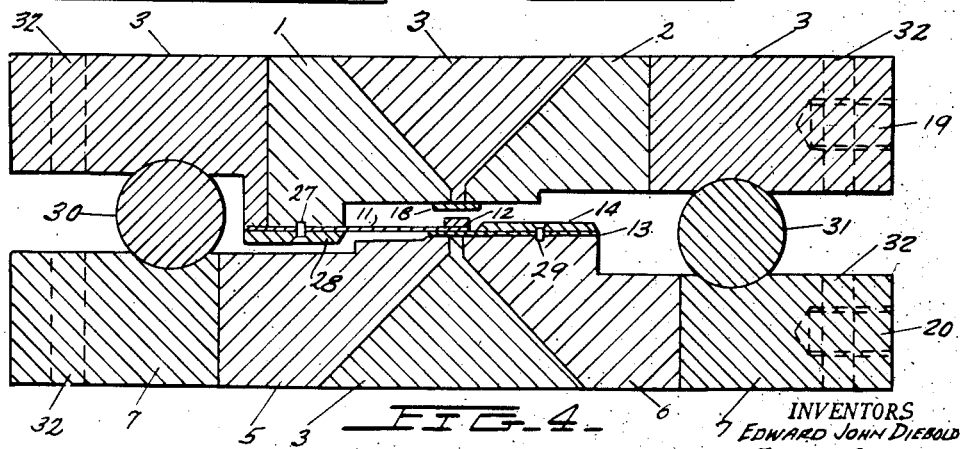
INVENTORS
EDWARD JOHN DIEBOLD
ELMER GOESSEL
BY
ATTORNEYS

United States Patent Office 2,805,300
Patented Sept. 3, 1957

2,805,300

ELECTROMAGNETIC CONTACT DEVICE

Edward John Diebold, Ardmore, and Elmer Goessel, Philadelphia, Pa., assignors to I-T-E Circuit Breaker Company, Philadelphia, Pa., a corporation of Pennsylvania Application March 1, 1955, Serial No. 491,350

12 Claims. (Cl. 200—91)

Our invention relates to electromagnetic switches. The type electromagnetic switch disclosed in this application can be applied to electromagnetic rectifiers of the type disclosed in copending U. S. applications, Serial No. 257,398 filed November 20, 1951 now Patent No. 2,756,380 July 24, 1956, Serial No. 372,455 filed August 5, 1953, and Serial No. 343,077 filed March 18, 1953, and assigned to the assignee of this application.

The electromagnetic switch of this invention can also be used at the load carrying switch of the inverter disclosed in copending application, Serial No. 364,421 filed June 26, 1953.

Electromagnetic switches, which can be used to carry high currents, can be described generally as consisting of a ferromagnetic and electrically conductive body of small size which is moved by magnetic forces between fixed magnetic poles which also serve as electrical conductors. Magnetization of the poles attracts the movable body to thereby establish an electrical circuit between them. Demagnetization of the magnetic poles releases the movable body which is carried away by another force, thus interrupting the electrical circuit.

The electric current flowing through the circuit established by the movable body and the poles can produce the magnetic field which provides a hold-in force. Loss of this current releases the body. The magnetic field required to close this circuit can be initiated by a small auxiliary current which does not flow through the movable body but through a parallel auxiliary circuit. Control of the time at which the small auxiliary current rises affords control of the large current flowing through the movable body.

Electromagnetic switches used for electromagnetic rectifiers and inverter applications in the past have been subjected to severe limitations since the movable contact is seated on a strong biasing spring and electromagnetic poles operate upon the armature and against the spring to effect engagement and disengagement of the cooperating contacts. Furthermore, a bridging type contact has been used in all prior art applications to thereby lead to further complications as will be discussed hereinafter.

Electromagnetic switches of this type have been shown in copending applications: Ser. No. 416,843, filed March 17, 1954; Ser. No. 257,398, filed November 20, 1951; Ser. No. 237,693, filed July 20, 1951, now Patent No. 2,732,450, January 24, 1956; Ser. No. 361,777, filed June 15, 1953, now Patent No. 2,727,114, December 13, 1955; and Ser. No. 427,018, filed May 3, 1954.

In each of the above-mentioned applications, a closing magnet is provided to cause engagement of the bridging contact and either an opening magnet or a spring bias is provided to cause disengagement of the bridging contact. The current carrying, magnetically responsive armature, is fastened to a strong biasing spring and the opening and closing magnetic or mechanical force then work against this spring bias.

The following disadvantages of this type arrangement become apparent immediately and have been shown to exist under test conditions:

1. Since the armature spring is a strong spring and it must vibrate 120 times per second when used in a rectifier rectifying a 60-cycle power source spring breakage is frequent.

2. Due to the strong spring bias, the opening and closing forces on the armature are only the difference between the spring bias force and the opening or closing force. Therefore, positive engagement and disengagement is not effected to thereby lead to bouncing contact operation.

3. In view of the bouncing contact operation, the over-all behavior of the switch is erratic and accurate contact timing is almost impossible.

4. Since the electromagnetically responsive armature is acted upon by external forces in a direction opposite to the force of the armature spring bias, the armature is very often torn away from the spring after short periods of operation.

5. In view of the high armature spring force, the magnetic structure to operate the armature is necessarily large to overcome this force.

6. Due to the nature of an armature riding on a strong spring, it is necessary to use a bridging type contact. This bridging type contact then leads to sliding engagement and disengagement. Furthermore, one side of the bridging contact very often engages before the other side to thereby lead to further sliding and particularly severe bouncing. Another disadvantage of the bridging contact is that two contact surfaces are necessary, thereby increasing contact resistance and contact heating.

7. The spring must be calibrated and carefully adjusted. This is a long painstaking procedure since the characteristics of each magnetic structure is different and the spring must be individually adjusted. Even with the most careful adjustment or calibration, the spring tension will still change with temperature and many other parameters to thereby necessitate constant readjustment and recalibration. The spring as well as being very difficult to adjust is very expensive to manufacture in view of the nature of the operation which it must perform.

8. Since each spring must be individually adjusted for the magnetic structure with which it will be assembled, the springs are not interchangeable from one magnetic structure to another.

9. Since bounce is such a severe problem with this type of spring and armature construction, complicated dampers are needed to inhibit this bounce. This has proven very difficult and a satisfactory damper has still not yet been found.

10. In view of the bridging contact construction sharp pole faces are placed in close proximity. This lowers the reverse voltage that the switch can withstand.

The principle of our invention is to first provide an armature which floats between an engaging and disengaging means such as the opening and closing magnetic structure and to keep the armature free of any type spring bias means. A current carrying spring such as a leaf spring is then provided and the armature responsive to the magnetic field of the opening and closing magnetic structure is fastened to the current carrying leaf spring. One of the structures such as the closing structure is then provided with a fixed contact so that the electromagnetically responsive armature can drive the current carrying spring into and out of engagement with the fixed contact. A part of the current carrying spring is then fastened to a second current conductor to thereby complete an electrical circuit upon the engagement of the leaf spring to its cooperating contact on the closing magnetic structure.

It is very important to note that this current carrying spring serves two functions; its first function is to be one of a set of cooperating contacts and thereby carry the main current and its second function is to guide the armature in its travel. Note that no biasing function is served by this novel current carrying spring as was done by springs shown in the prior art.

With this principle in mind, it is seen that our novel electromagnetic switch eliminates each of the above-mentioned disadvantages of the prior art switches, first because the armature is not carried by a strong biasing spring and secondly because the bridging contact of the prior art is now replaced by cooperating contacts which engage and disengage on only one surface.

Some of the new advantages presented by this type switch are as follows:

1. The magnetic structure can now be small since it only has to overcome the inertia of a very small armature rather than that same armature mass plus the strong biasing force of the spring which carries the armature in prior art arrangements.

2. Prior art arrangements have shown the contacts of the stationary bridging contact lying on the same axis. Because of this, the heavy copper structure on either side of the stationary bridging contact is below the axis, and insulating air above the axis in the region of the biasing spring. The new principle contained in our invention now allows the upper copper structure fastened to the current carrying leaf spring to be placed on top of the closing copper structure. In view of this, the entire switch can now be placed in a small volume as compared to the volume required by the prior art switches. There is, however, an extremely important advantage other than small space that is inherent in this novel construction. That is, with this type of construction the cooperating contacts which are small with respect to the current they are carrying are now completely surrounded by a heavy copper structure. This heavy copper structure now affords excellent heat dissipation means around the cooperating contacts whereas in prior art, the cooperating contacts had heavy heat dissipating copper placed below them and heat insulating air above them.

3. A third advantage is that the contact now engages and disengages without sliding as was the case with the bridging type contact.

4. A further important advantage of the single break contact used in our invention is that since only one contact surface takes place in engagement and disengagement only one-half of the heat is developed as would be developed in the case of two surfaces effecting engagement and disengagement as in the bridging type contact.

5. The nature of this novel switch now allows the use of only two air gaps in the magnetic structure. This reduces the magneto motive force required for operation to thereby further reduce the size of the magnetic structure.

6. Since the armature is now divorced from a strong spring, oscillations which would be caused by a strong spring are now eliminated.

7. Since the armature is now positively attracted upon engagement or disengagement of the cooperating contacts, only the simplest type of damping is required to keep the contacts from effecting bouncing engagement or disengagement.

8. The pole faces of the magnetic structure can now be made without sharp faces in close proximity to each other. Therefore this novel type switch can withstand a high reverse voltage.

9. Our novel switch provides extremely simple manufacture as compared to the prior art type switch. The switch proper and drive magnet of our invention can now be made as integral parts which can be sub-assembled with the main drive magnet.

10. Still another important feature of this invention is that the switch is now interchangeable with many magnetic structures. This is due to the fact that the current carrying guide spring is not calibrated as were the strong bias springs of the prior art switches.

In view of the foregoing remarks, it is a primary object of our invention to provide an electromagnetically responsive armature fastened to a current carrying guide spring which is then used as one of a set of cooperating contacts.

Another object of our invention is to provide an electromagnetic switch in which the opening and closing magnetic structures are embedded in their respective current carrying housing and the current carrying housings positioned below and above the cooperating contacts to thereby provide effective heat dissipating means.

Still another object of our invention is to provide an electromagnetic switch having a single break-type armature to thereby decrease the heat developed in the cooperating contacts, and sliding contact engagement.

A further object of our invention is to provide an electromagnetic switch which can have a current carrying spring to guide the electromagnetically responsive armature in its motion from engaged position to disengaged position.

A still further object of our invention is to provide an electromagnetic switch which can have a high current rating and is interchangeable with any main magnetic structure.

These and other objects of our invention will become apparent from the following description taken in connection with the drawings in which:

Figure 1 shows a side view in section of our novel electromagnetic switch.

Figure 2 shows a top view of a current carrying leaf type spring which can be used in the embodiment of Figure 1.

Figure 3 shows a side view of the electromagnetic switch of Figure 1 in conjunction with the complete opening and closing magnetic structure.

Figure 4 shows a side view in section of a second embodiment of our novel electromagnetic switch.

Figure 5 shows a cross-sectional view of Figure 1 across the lines 5—5.

The electromagnetic switch of Figure 1 and Figure 5 consists of two upper magnetic poles 1 and 2 which comprise a part of the opening magnetic structure. These poles are made of silicon iron laminations which are clamped between two heavy copper terminal plates 3, as may be best seen in Figure 5.

The assembly of the iron laminations 1 and 2 and copper plate or current carrying housing 3 are clamped together by soft brass rivets 4. The lower magnetic poles 5 and 6 constitute a part of the closing magnetic structure. Poles 5 and 6 are similar to poles 1 and 2 and consist of iron laminations which are clamped in a second current carrying housing 7, one plate of which is shown in the sectional view of Figure 1. The clamping means for this lower structure is shown as soft brass rivets 8.

The upper poles 1 and 2 are then properly positioned with respect to lower poles 5 and 6 by means of insulating spacers 9 and 10. The current carrying spring 11 carries the electromagnetically responsive armature 12 and is shown as being in engaged position with current carrying buffer 13. Current carrying buffer 13 is then electrically fastened to the current carrying housing 7 by means of pressure applied between current carrying housing 7 and the conducting pressure plate 14. The complete unit now can be assembled by merely positioning the parts with respect to one another and inserting and fastening screws 15. Screws 15 pass through an insulating bushing 16 to thereby insulate current carrying housing 7 from current carrying housing 3.

In assembling the upper and lower switch, the armature 12 which can be made of a material of high saturation such as electrolytic iron, carbonyl iron or permandur is located centrally with respect to the upper poles 1 and 2 and lower poles 5 and 6 by means of the current carrying armature spring 11 to which it is fastened.

A top view of current carrying spring 11 is shown in Figure 2. In this figure, the position of armature 12 is shown. Holes 17 are to receive the assembling screws 15 of Figure 1. The spring 11 is shown as having a triangular shape and a wide base which gradually tapers down to the width of the armature. This type construction shows mechanical characteristics which are acceptable in the operation of our novel switch.

Spring 11 prevents armature 12 from moving laterally and lengthwise with respect to the magnetic poles 1, 2, 5 and 6, yet allows complete freedom of motion between the upper poles 1 and 2 and lower poles 5 and 6. When armature 12 is in the engaged position shown in Figure 1, it rests on the buffer 13 which will cushion the blow of the armature whenever it is attracted to the lower poles 5 and 6. This cushioning reduces the tendency of the armature 12 to bounce. Should the armature 12 bounce on closing, buffer 13 will tend to follow it because of its resilience and still maintain contact between spring 11 and buffer plate 13.

A second buffer plate 18 in Figure 1 is positioned on the upper magnetic poles 1 and 2. Its purpose is to cushion the blow of the armature 12, thereby reducing the tendency for bouncing of armature 12 whenever it is attracted to pole faces 1 and 2. The external circuit can be fastened to the switch by means of threaded holes 19 and 20. Buffer plates 13 and 18 therefore act as very simple dampers to inhibit contact bounce.

It should be noted that the complete switch for Figure 1 is essentially two units, one being the upper poles 1 and 2 embedded in their current carrying housing 3 and the second being the lower poles 5 and 6 embedded in their current carrying housing 7. The upper and lower poles are then separated by two insulating spacers 9 and 10 with the spring mounted armature 12 between them. This construction is much simpler than any shown in the prior art.

The two terminals 19 and 20 of the switch, which at times are at different potentials are separated by the two insulating spacers 9 and 10 which are always under compression. Previous designs required elaborate insulation and housings of such stable materials as steatite, mica, porcelain, etc. Furthermore, prior art switches required in the case of damage to the switch by back fire or over current of too long a duration, that the switch be discarded because repairs were too difficult. However, in case of damage to the switch shown in Figure 1, the switch can be easily dismantled and the contact guide spring 11 and buffer 13 can then be quickly replaced.

Figure 3 shows the switch of Figure 1 (enclosed in a heavy solid line) with respect to one possible arrangement of a main opening and closing magnetic structure. The closing magnetic structure 21 which consists of iron laminations similar to the iron laminations of closing poles 5 and 6 of Figure 1 can have a main current carrying coil 22 and an operating coil 23. The opening magnetic structure 24 could contain operating coils 25 and 26. The operation of the electromagnetic switch shown in Figure 3 would depend on the type circuitry used to energize coils 22, 23, 25 and 26.

It should be noted that electromagnetic switches of this type would be completely interchangeable with any magnetic structure of the type shown in Figure 3. Replacement is extremely simple since the new switch would merely be inserted in the magnetic structure to have the corresponding pole faces of the switch match the pole faces of the magnetic structure as is shown in Figure 3.

Figure 4 presents a second embodiment of our novel electromagnetic switch. This embodiment differs from the embodiment of Figure 1 in that it presents a construction which provides a much simpler method of assembly. The embodiment of Figure 4 also provides for extremely accurate adjustment of the air gap between the upper poles 1 and 2 and the lower poles 5 and 6. The upper poles 1 and 2 of Figure 4 are embedded in a copper housing 3 and the lower poles 5 and 6 are embedded in a copper housing 7 similarly to the switch of Figure 1. However, the current-carrying spring 11 now becomes a sub-assembly of the upper switch structure. That is, current-carrying spring 11 is now clamped to the current carrying housing 3 by means of screws 27 and conducting pressure plate 28.

Current-carrying buffer 13 now becomes a sub-assembly of the lower switch housing and is fastened to current-carrying body 7 by means of screws 29 and pressure plate 14. The upper and lower switch housings can then be insulated by accurately ground spacers 30 and 31 which can be made of a material such as steatite.

This switch now provides very simple assembly and accurate adjustment of the air gaps. Upon damage to the contact, the lower switch housing can be disconnected from the upper switch housing by unfastening a bolt which passes through holes 32 and 33 and replacing the current-carrying spring 11 and current-carrying buffer 13. No new adjustment of the spring or buffer is required and the spring 11 and buffer 13 are automatically correctly positioned by means of screws 27 and 29.

Although we have described our invention with preferred embodiments thereof, it will now become apparent that many variations and modifications may be made by those skilled in the art. We prefer to be limited, therefore, not by the specific disclosures herein, but only by the appended claims.

We claim:

1. In an electromagnetic switch having an opening magnetic structure, a closing magnetic structure, an armature responsive to a magnetic field, a current-conducting leaf spring, and operating coils for said opening and closing magnetic structures; said opening magnetic structure comprising a combined magnetic pole structure embedded in a first current carrying housing and forming a composite current carrying and high magnetic flux permeable member; said closing magnetic structure comprising a combined magnetic pole structure embedded in a second current carrying housing and forming a composite current-carrying and high magnetic flux permeable member; said first and said second current-carrying housing electrically insulated from one another; said conducting leaf spring having said armature fastened to one end thereof and the other end maintained in electrical contact with said second current-carrying housing; said opening and closing magnetic structures being positioned adjacent opposite sides of said armature attached to one end of said current-conducting leaf spring to cause said current-conducting leaf spring to engage said first current carrying housing to thereby place said first and second electrically insulated current-carrying housings in electrical contact when said closing magnetic structure is energized by said operating coils and to cause said current-conducting leaf spring to disengage said first current-carrying housing when said armature responds to the magnetic field of said opening magnetic structure when said opening magnetic structure is energized by said opening magnet operating coil.

2. In an electromagnetic switch having a first current carrying housing electrically insulated from a second current carrying housing; a current carrying cantilever spring constructed to be responsive to a magnetic field having an end electrically connected to said first current carrying housing and the other end movable into and out of electrical engagement with said second current carrying housing; said opening magnetic structure comprising a combined magnetic pole structure embedded in a first current carrying housing and forming a composite current carrying and high magnetic flux permeable member; said closing magnetic structure comprising a combined magnetic pole structure embedded in a second current carrying housing and forming a composite current carrying and high magnetic flux permeable member; energizing means for said first and second magnetic structures; said current carrying spring being disengaged from said second current carrying housing and said second magnetic structure and moved into engagement with said second current carrying housing responsive to energization of said first magnetic structure.

3. In an electromagnetic switch having a relatively high current capacity; an opening magnetic structure comprising a combined magnetic pole structure embedded in a first current carrying housing and forming a composite current carrying and high magnetic flux permeable member; a closing magnetic structure comprising a combined magnetic pole structure embedded in a second current carrying housing and forming a composite current carrying and high magnetic flux permeable member; energizing means for said first and second magnetic structures; said first and second current-carrying housing electrically insulated from each other; an armature constructed to be movable responsive to a magnetic field fastened to a current-carrying spring; said current-carrying spring flexibly connected in electrical contact to said first current-carrying housing; said first and second magnetic structure positioned adjacent opposite sides of said armature to cause said armature to move said current carrying spring to electrical engagement with said second current carrying housing when said second magnetic structure is energized and to electrical disengagement with said second current carrying housing when said first magnetic structure is energized.

4. In an electromagnetic switch having a relatively high current capacity; an opening magnetic structure comprising a combined magnetic pole structure embedded in a first current carrying housing and forming a composite current carrying and high magnetic flux permeable member; a closing magnetic structure comprising a combined magnetic pole structure embedded in a second current carrying housing and forming a composite current carrying and high magnetic flux permeable member; energizing means for said first and second magnetic structures; said first and second current-carrying housing electrically insulated from each other; a current-carrying buffer in electrical engagement with said second carrying housing; an armature constructed to be movable responsive to a magnetic field fastened to a current-carrying spring; said current-carrying spring flexibly connected in electrical contact to said first current-carrying housing; said first and second magnetic structure positioned adjacent opposite sides of said armature to cause said armature to move said current-carrying spring to electrical engagement with said current-carrying buffer when said second magnetic structure is energized and to electrical disengagement with said current carrying buffer when said first magnetic structure is energized.

5. In an electromagnetic switch having a relatively high current capacity; an opening magnetic structure comprising a combined magnetic pole structure embedded in a first current carrying housing and forming a composite current carrying and high magnetic flux permeable member; a closing magnetic structure comprising a combined magnetic pole structure embedded in a second current carrying housing and forming a composite current carrying and high magnetic flux permeable member; energizing means for said first and second magnetic structures; said first and second current-carrying housing electrically insulated from each other; a current-carrying buffer in electrical engagement with said second carrying housing; an armature constructed to be movable responsive to a magnetic field fastened to a current-carrying spring; said current-carrying spring flexibly connected in electrical contact to said first current-carrying housing; said first and second magnetic structure positioned adjacent opposite sides of said armature to cause said armature to move said current-carrying spring to electrical engagement with said current-carrying buffer when said second magnetic structure is energized and to electrical disengagement with said current carrying buffer when said first magnetic structure is energized; a damping buffer positioned on said first current-carrying body to engage said armature when said first magnetic structure is energized to disengage said first and second current-carrying housing.

6. In an electromagnetic switch having cooperating contacts to electrically engage and disengage a first and second current-carrying housing electrically insulated from one another; said first and second current-carrying housings respectively positioned above and below said cooperating contacts to substantially enclose said cooperating contacts in a current conducting enclosure; said cooperating contacts comprising said second current-carrying housing and a current-carrying spring constructed to be movable responsive to a magnetic field and electrically connected to said first current-carrying housing; a first magnetic structure comprising a combined magnetic pole structure embedded in said first current carrying housing and forming a first composite current carrying and high magnetic flux permeable member; a second magnetic structure embedded in said second current carrying housing and forming a second composite current carrying and high magnetic flux permeable member; an energizing means for said first and second magnetic structure; said first and second magnetic structures positioned to cause engagement of said cooperating contacts when second magnetic structure is energized and disengagement of said cooperating contacts when said first magnetic structure is energized.

7. In an electromagnetic switch having cooperating contacts to electrically engage and disengage a first and second current-carrying housing electrically insulated from one another; said first and second current-carrying housings respectively positioned above and below said cooperating contacts to substantially enclose said cooperating contacts in a current-conducting enclosure; said cooperating contacts comprising said second current-carrying housing and a current-carrying spring constructed to be movable responsive to a magnetic field and electrically connected to said first current-carrying housing; a first magnetic structure comprising a combined magnetic pole structure embedded in said first current carrying housing and forming a first composite current carrying and high magnetic flux permeable member; a second magnetic structure embedded in said second current carrying housing and forming a second composite current carrying and high magnetic flux permeable member; an energizing means for said first and second magnetic structures positioned to cause said current-carrying spring movable responsive to a magnetic field to engage and disengage said second carrying housing in accordance with the energization of said first and second magnetic structures.

8. In an electromagnetic switch for relatively high current capacity having cooperating contacts to electrically engage and disengage a first and second current-carrying housing electrically insulated from one another; said first and second current-carrying housings respectively positioned above and below said cooperating contacts to substantially enclose said cooperating contacts in a current-conducting enclosure; said cooperating contacts comprising a current-carrying removable buffer electrically connected to said second current-carrying housing and a current-carrying spring removably connected to said first current-carrying housing; an armature movable responsive to a magnetic field connected to said current-carrying spring; a first magnetic structure comprising a combined magnetic pole structure embedded in said first current carrying housing and forming a first composite current carrying and high magnetic flux permeable member; a second magnetic structure embedded in said second current carrying housing and forming a second composite current carrying and high magnetic flux permeable member; means to energize said first and second magnetic structures; said first and second magnetic structures constructed to cause said armature movable responsive to a magnetic field to engage and disengage said second current carrying housing responsive to the energization of said first and second magnetic structure; a buffer positioned on said first current-carrying housing to engage said armature when said cooperating contacts are moved to a disengaged position.

9. In an electromagnetic switch, an opening magnetic structure comprising a combined magnetic pole structure embedded in a first current carrying housing and forming a composite current carrying and high magnetic flux permeable member; a closing magnetic structure comprising a combined magnetic pole structure embedded in a second current carrying housing and forming a composite current carrying and high magnetic flux permeable member; energizing means for said first and second magnetic structures; said first and second current-carrying housings electrically insulated from one another; a substantially massless armature constructed to be movable responsive to a magnetic field and a current-carrying leaf spring; said current-carrying spring having a triangular shape in which the base is electrically connected to said first current-carrying housing, said armature fastened to the vertex of said triangular current-carrying leaf spring which is opposite to said fastened base; said current-carrying spring and armature positioned between said first and second magnetic structures to allow said current-carrying spring to engage and disengage said second current-carrying housing responsive to energization of said first and second magnetic structure by their said energizing means.

10. In an electromagnetic switch; an opening magnetic structure comprising a combined magnetic pole structure embedded in a first current carrying housing and forming a composite current carrying and high magnetic flux permeable member; a closing magnetic structure comprising a combined magnetic pole structure embedded in a second current carrying housing and forming a composite current carrying and high magnetic flux permeable member; energizing means for said first and second magnetic structures; said first and second current-carrying housings electrically insulated from one another; a substantially massless armature constructed to be movable responsive to a magnetic field and a current-carrying leaf spring; said current-carrying spring having a triangular shape in which the base is electrically connected to said first current-carrying housing, said armature fastened to the vertex of said triangular current-carrying leaf spring which is opposite to said fastened base; a current-carrying buffer electrically connected to said second current-carrying housing; said current-carrying spring and armature positioned between said first and second magnetic structures to allow said current-carrying spring to engage and disengage said current-carrying buffer responsive to energization of said first and second magnetic structure by their said energizing means.

11. In an electromagnetic switch having cooperating contacts to electrically engage and disengage a first and second current-carrying housing electrically insulated from one another; said first and second current-carrying housings respectively positioned above and below said cooperating contacts to substantially enclose said cooperating contacts in a current-conducting enclosure; one of said cooperating contacts comprising said second current-carrying housing and the second cooperating contact comprising a triangular current-carrying leaf spring and a substantially massless armature, a base of said triangular spring electrically connected to said first current-carrying housing, said armature connected to said current-carrying spring at the vertex opposite to said connected base of said current-carrying spring; a first magnetic structure and a second magnetic structure and energizing means therefor; said first and second magnetic structures being positioned opposite adjacent sides of and said current-carrying leaf spring and armature to move said current-carrying leaf spring into and out of engagement with said second current-carrying housing responsive to said energizing means of said first and second magnetic structure.

12. In an electromagnetic switch having a first current carrying housing electrically insulated from a second current carrying housing; a current carrying cantilever spring constructed to be movable responsive to a magnetic field having an end electrically connected to said first current carrying housing and the other end movable operable into and out of electrical engagement with said second current carrying housing; a first magnetic structure comprising a combined magnetic pole structure embedded in said first current carrying housing and forming a first composite current carrying and high magnetic flux permeable member; a second magnetic structure embedded in said second current carrying housing and forming a second composite current carrying and high magnetic flux permeable member; said first and second magnetic structure being positioned opposite adjacent faces of said current carrying spring; said first magnetic structure constructed to cause said current carrying spring to disengage said second current carrying housing when energized and said second magnetic structure to cause said current carrying spring to engage said second current carrying housing when energized.

References Cited in the file of this patent

UNITED STATES PATENTS

| | | |
|---|---|---|
| 1,106,372 | Eisenmann | Aug. 11, 1914 |
| 1,819,420 | Kabele | Aug. 18, 1931 |
| 2,009,892 | Leece | July 30, 1935 |
| 2,296,123 | Stimson | Sept. 15, 1942 |
| 2,658,971 | Wettstein | Nov. 10, 1953 |

FOREIGN PATENTS

| | | |
|---|---|---|
| 387,792 | Great Britain | Feb. 16, 1933 |